(12) United States Patent
Wu et al.

(10) Patent No.: US 12,238,751 B2
(45) Date of Patent: Feb. 25, 2025

(54) SIDELINK RESOURCE ALLOCATION USING INTERFERENCE CANCELLATION CAPABILITIES

(71) Applicant: QUALCOMM Incorporated, San Diego, CA (US)

(72) Inventors: Shuanshuan Wu, San Diego, CA (US); Kapil Gulati, Belle Mead, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 17/658,713

(22) Filed: Apr. 11, 2022

(65) Prior Publication Data

US 2023/0328768 A1     Oct. 12, 2023

(51) Int. Cl.
  *H04W 72/20*    (2023.01)
  *H04B 17/318*   (2015.01)
  *H04W 72/542*   (2023.01)

(52) U.S. Cl.
  CPC ........ *H04W 72/542* (2023.01); *H04B 17/318* (2015.01); *H04W 72/20* (2023.01)

(58) Field of Classification Search
  CPC ... H04W 72/542; H04W 72/20; H04W 28/26; H04W 72/02; H04B 17/318
  See application file for complete search history.

(56) References Cited

U.S. PATENT DOCUMENTS

| | | | |
|---|---|---|---|
| 2014/0128115 A1* | 5/2014 | Siomina | H04L 1/0026 455/501 |
| 2020/0374861 A1 | 11/2020 | Shilov et al. | |
| 2021/0219320 A1* | 7/2021 | Belleschi | H04W 72/20 |
| 2021/0314916 A1* | 10/2021 | Fouad | H04W 72/02 |
| 2022/0029756 A1 | 1/2022 | Sarkis et al. | |
| 2022/0272709 A1* | 8/2022 | Jiang | H04W 72/53 |
| 2022/0377748 A1* | 11/2022 | He | H04W 4/70 |

FOREIGN PATENT DOCUMENTS

| | | |
|---|---|---|
| WO | 2021163460 A1 | 8/2021 |
| WO | 2022045718 A1 | 3/2022 |

OTHER PUBLICATIONS

International Search Report and Written Opinion—PCT/US2023/064425—ISA/EPO—Jul. 7, 2023.

* cited by examiner

*Primary Examiner* — Edan Orgad
*Assistant Examiner* — Malick A Sohrab
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of capability information that indicates interference cancellation (IC) capability information associated with at least one UE. The UE may receive sidelink control information (SCI) that indicates sidelink resource reservation information in a resource selection window. The UE may transmit an indication of one or more reserved resources for a sidelink communication, the one or more reserved resources being based at least in part on the IC capability information and the sidelink resource reservation information. Numerous other aspects are described.

30 Claims, 8 Drawing Sheets

SIDELINK RESOURCE ALLOCATION USING INTERFERENCE CANCELLATION CAPABILITIES

FIELD OF THE DISCLOSURE

Aspects of the present disclosure generally relate to wireless communication and to techniques and apparatuses for sidelink resource allocation using interference cancellation capabilities.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving an indication of capability information that indicates interference cancellation (IC) capability information associated with at least one UE. The method may include receiving sidelink control information (SCI) that indicates sidelink resource reservation information in a resource selection window. The method may include transmitting an indication of one or more reserved resources for a sidelink communication, the one or more reserved resources being based at least in part on the IC capability information and the sidelink resource reservation information.

Some aspects described herein relate to a UE for wireless communication. The UE may include a memory and one or more processors coupled to the memory. The one or more processors may be configured to receive an indication of capability information that indicates IC capability information associated with at least one UE. The one or more processors may be configured to receive SCI that indicates sidelink resource reservation information in a resource selection window. The one or more processors may be configured to transmit an indication of one or more reserved resources for a sidelink communication, the one or more reserved resources being based at least in part on the IC capability information and the sidelink resource reservation information.

Some aspects described herein relate to a non-transitory computer-readable medium that stores a set of instructions for wireless communication by a UE. The set of instructions, when executed by one or more processors of the UE, may cause the UE to receive an indication of capability information that indicates IC capability information associated with at least one UE. The set of instructions, when executed by one or more processors of the UE, may cause the UE to receive SCI that indicates sidelink resource reservation information in a resource selection window. The set of instructions, when executed by one or more processors of the UE, may cause the UE to transmit an indication of one or more reserved resources for a sidelink communication, the one or more reserved resources being based at least in part on the IC capability information and the sidelink resource reservation information.

Some aspects described herein relate to an apparatus for wireless communication. The apparatus may include means for receiving an indication of capability information that indicates IC capability information associated with at least one UE. The apparatus may include means for receiving SCI that indicates sidelink resource reservation information in a resource selection window. The apparatus may include means for transmitting an indication of one or more reserved resources for a sidelink communication, the one or more reserved resources being based at least in part on the IC capability information and the sidelink resource reservation information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
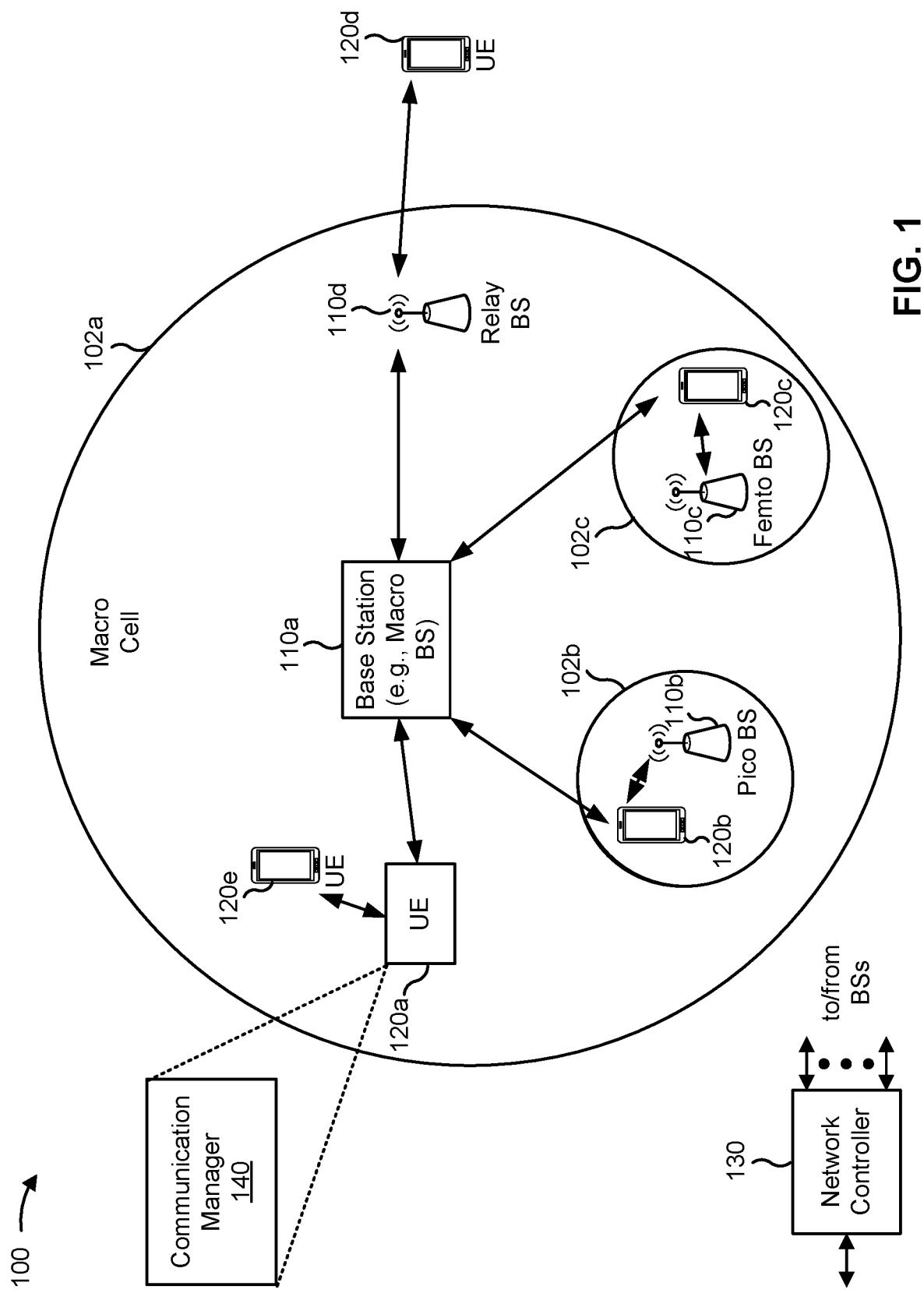
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

Deployment of communication systems, such as 5G New Radio (NR) systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), transmit receive point (TRP), or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an indication of capability information that indicates interference cancellation (IC) capability information associated with at least one UE; receive sidelink control information (SCI) that indicates sidelink resource reservation information in a resource selection window; and transmit an indication of one or more reserved resources for a sidelink communication, the one or more reserved resources being based at least in part on the IC capability information and the sidelink resource reservation information. Additionally, or alternatively, the communication manager 140 may perform one or more other operations described herein.

As indicated above, FIG. 1 is provided as an example. Other examples may differ from what is described with regard to FIG. 1.

Figure 2:
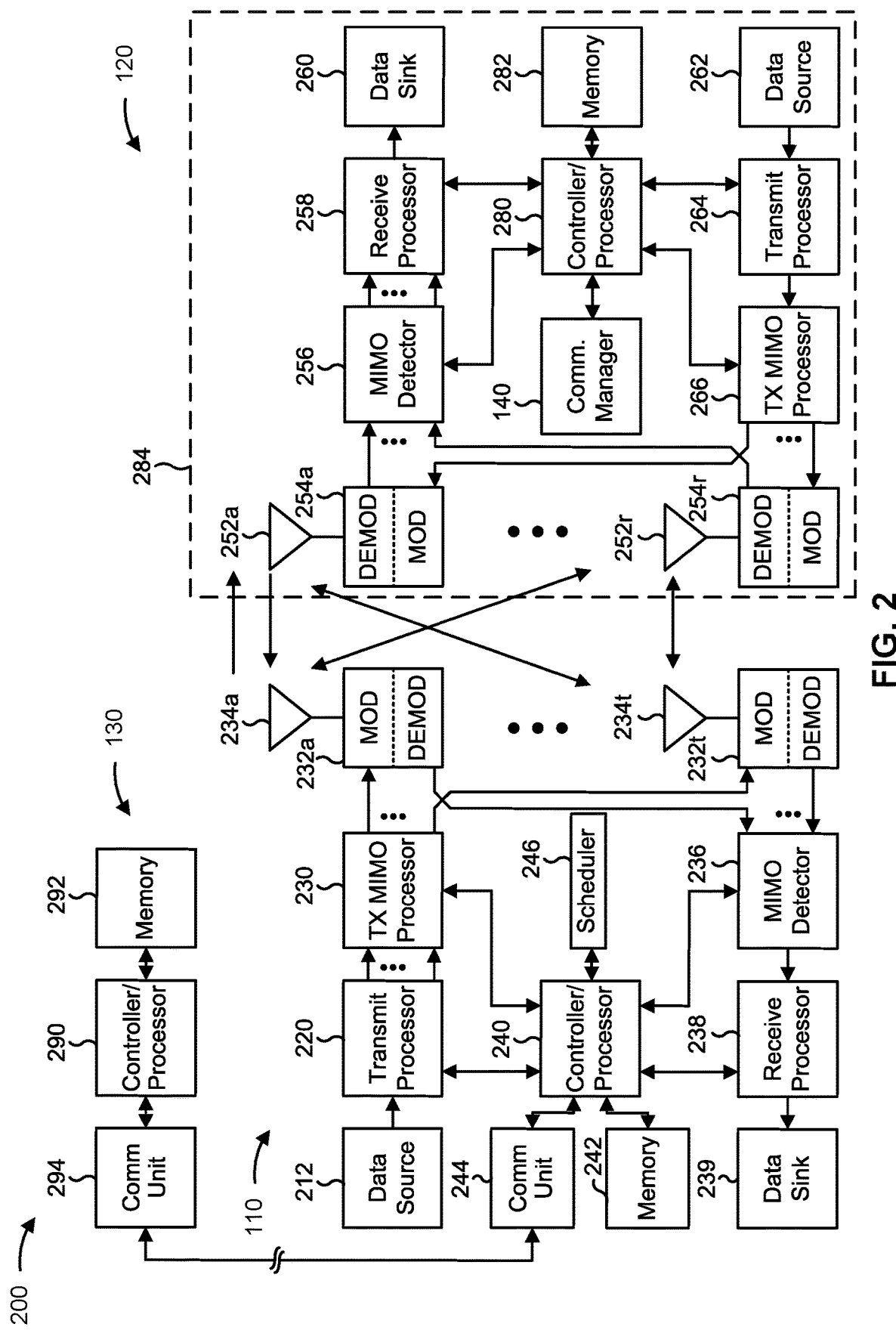
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-8).

The controller/processor 240 of the base station 110, the controller/processor 280 of the UE 120, and/or any other component(s) of FIG. 2 may perform one or more techniques associated with sidelink resource allocation using interference cancellation capabilities, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving an indication of capability information that indicates interference cancellation (IC) capability information associated with at least one UE; means for receiving sidelink control information (SCI) that indicates sidelink resource reservation information in a resource selection window; and/or means for transmitting an indication of one or more reserved resources for a sidelink communication, the one or more reserved resources being based at least in part on the IC capability information and the sidelink resource reservation information. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
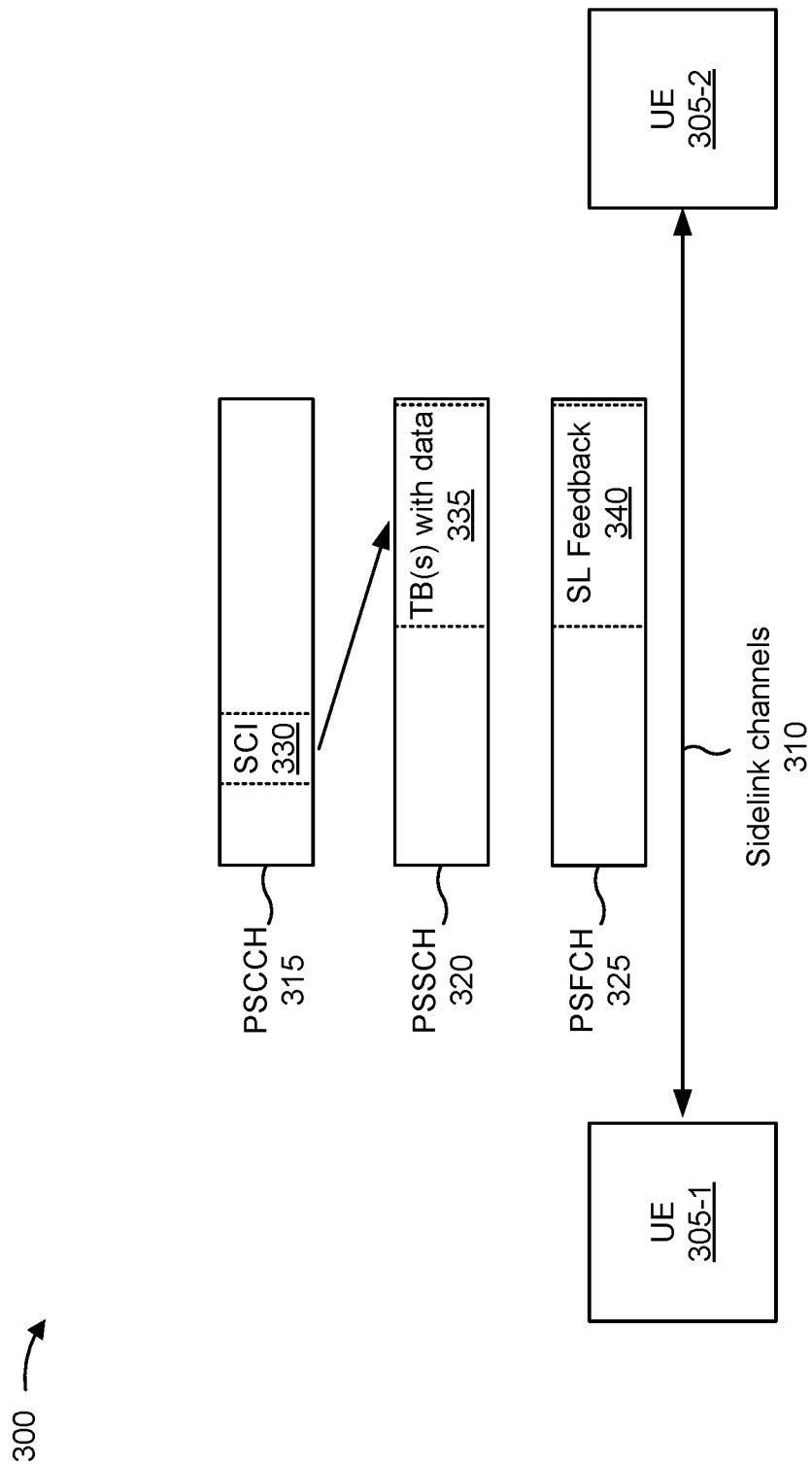
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
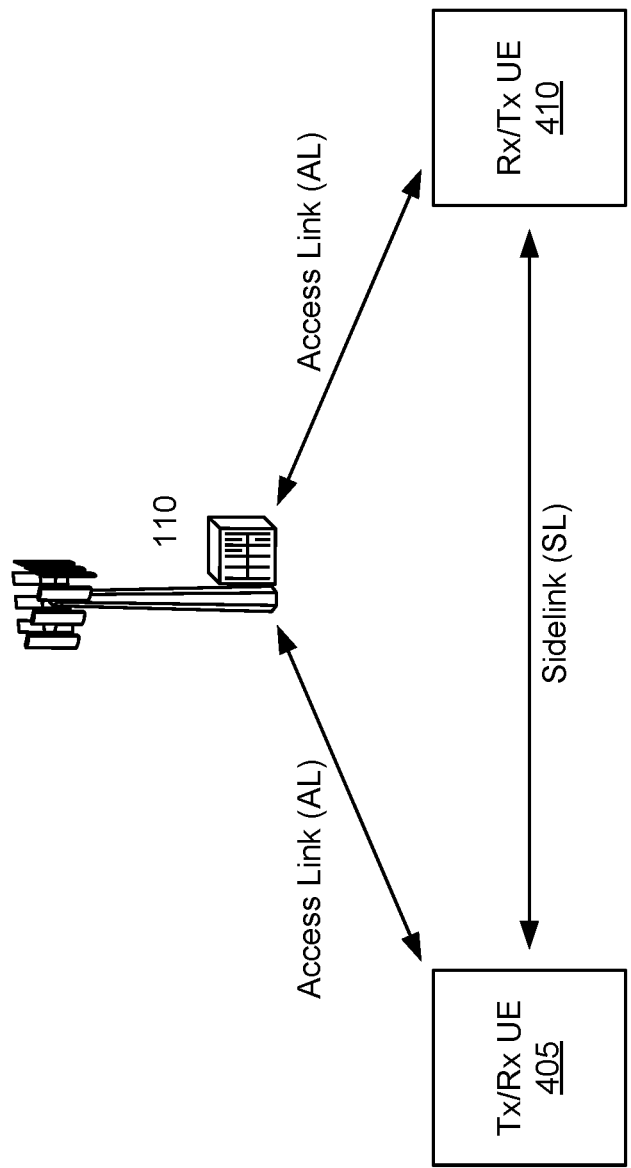
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
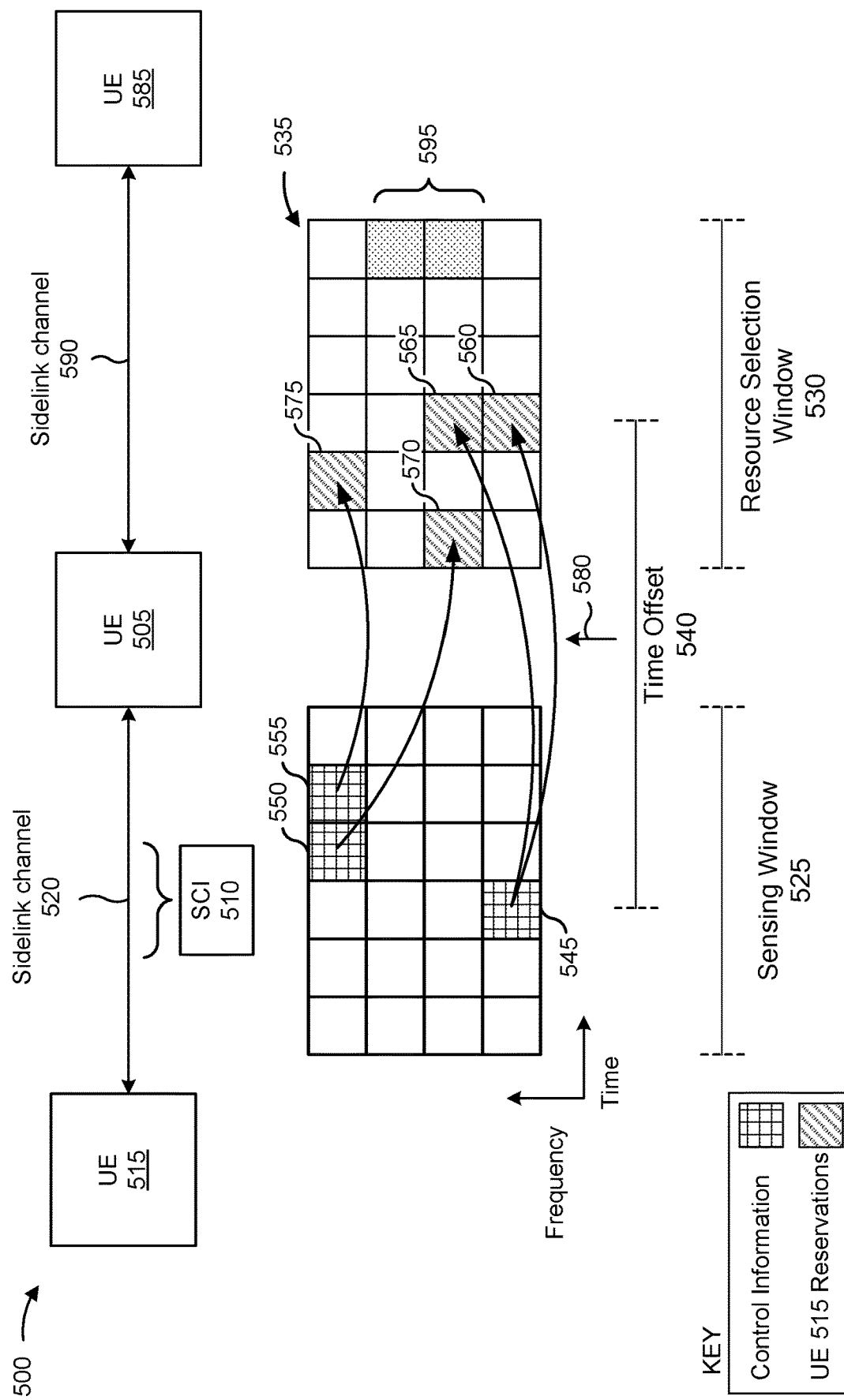
FIG. 5 is a diagram illustrating an example 500 of a resource sensing and/or a resource reserving procedure, in accordance with the present disclosure.

FIG. 5 is a diagram illustrating an example 500 of a resource sensing and/or a resource reserving procedure, in accordance with the present disclosure. As shown in FIG. 5, a UE (e.g., a UE 120) may use the resource sensing procedure to select resources from a resource window for sidelink communication. For example, the UE (e.g., rather than a base station) may select resources for sidelink communication based at least in part on operating in a Mode 2 transmission mode, as further described with regard to FIG. 3.

In some aspects, the UE may perform resource selection and/or scheduling by sensing channel availability for transmissions and/or based at least in part on resource reservation information associated with one or more other UEs. To illustrate, a first UE 505 may receive sidelink control information 510 (SCI 510) from a second UE 515 over a first sidelink channel 520, where the SCI 510 may indicate resource reservation information (e.g., one or more reserved resources, preferred resources, and/or non-preferred resources) associated with the second UE 515. The first UE 505 may analyze the resource reservation information based at least in part on a sensing window 525, a resource selection window 530, and/or a signal metric (e.g., RSRP, RSSI, or RSRQ). While the example 500 shows the first UE 505 receiving resource reservation information from a single UE (e.g., the second UE 515), alternate examples may include the first UE 505 receiving resource reservation information from multiple UEs.

The resource selection window 530 may include a resource pool 535 of M resources that are based at least in part on frequency and time partitions (e.g., sub-channel frequency partitions and/or time slot time partitions) for future sidelink transmissions. M denotes an integer and may be based at least in part on a size (e.g., time duration and/or frequency span) of the resource selection window 530. In some aspects, the sensing window 525 and the resource selection window may be separated by a time offset 540 known to the first UE 505. As one example, the first UE 505 may receive, from a base station, configuration information that indicates a configuration of the sensing window 525, the resource selection window 530, and/or the time offset 540. As another example, the first UE 505 may be pre-configured with the configuration information of the sensing window 525, the resource selection window 530, and/or the time offset 540. Examples of pre-configured configuration may include configuration information that is stored in memory of the first UE 505 and/or configuration information that the first UE 505 reads from a file.

In some aspects, and as part of the resource sensing procedure, the first UE 505 may receive and decode the SCI 510 to obtain the resource reservation information associated with the second UE 515. As one example, the second UE 515 may transmit a first portion of the SCI 510 using a first sensing window resource 545, a second portion of the SCI 510 using a second sensing window resource 550, and/or a third portion of the SCI 510 using a third sensing window resource 555. The first UE 505 may receive the SCI 510 based at least in part on receiving the first sensing window resource 545, the second sensing window resource 550, and/or the third sensing window resource 555. The first UE 505 may decode the SCI 510 received using the first sensing window resource 545, the second sensing window resource 550, and/or the third sensing window resource 555 to obtain the resource reservation information associated with the second UE 515. To illustrate, the first portion of SCI 510 transmitted using the first sensing window resource 545 may indicate that the second UE 515 has reserved a first resource selection window resource 560 and a second resource selection window resource 565. A second portion of the SCI 510 transmitted using the second sensing window resource 550 may indicate that the second UE 515 has reserved a third resource selection window resource 570. A third portion of the SCI 510 transmitted using the third sensing window resource 555 may indicate that the second UE 515 has reserved a fourth resource selection window resource 575. In some aspects, the first UE 505 may identify the first resource selection window resource 560, the second resource selection window resource 565, the third resource selection window resource 570, and/or the fourth resource selection window resource 575 based at least in part on an index value indicated by the SCI 510 and/or the time offset 540.

As part of the resource sensing procedure, the first UE 505 may perform one or more measurements and/or generate one or more metrics (e.g., RSRP, RSSI, and/or RSRQ) based at least in part on a sidelink channel and/or one or more resources associated with the sidelink channel. For instance, the first UE 505 may perform a measurement and/or generate a metric based at least in part on a resource in the sensing window 525, such as the first sensing window resource 545.

In some aspects, the first UE 505 may associate the measurement result generated based at least in part on a sensing window resource with a resource selection window resource. To illustrate, the first UE 505 may associate the measurement result generated based at least in part on the first sensing window resource 545 with the resource selection window resource 560 based at least in part on the time offset 540. The first UE 505 may identify available and/or unavailable resources in the resource selection window 530 based at least in part on the measurement result and the association. For example, the measurement result may provide an indication of resources in the resource selection window that are occupied and/or may have high interference. In some examples, the UE may compare the measurement result to a threshold, such as an RSRP threshold. The UE may determine that a resource associated with a measurement result that fails to satisfy the threshold (e.g., has an RSRP value above the threshold) is occupied. Accordingly, the UE may exclude a resource identified as being occupied from selection. Alternatively or additionally, the UE may exclude from selection a resource that another UE has indicated is reserved (e.g., using the SCI).

As shown in FIG. 5, the first UE 505 may initiate the resource selection procedure and/or select a resource to reserve based at least in part on a resource selection trigger 580. For example, the first UE 505 may trigger the resource selection procedure based at least in part on the first UE 505 having data and/or information to transmit to a third UE 585 over a sidelink channel 590. In some aspects, and based at least in part on the resource selection trigger 580, the first UE 505 may initiate the resource selection procedure to select and/or reserve one or more resources from the resource selection window 530, such as the resources shown by reference number 595, for transmitting the data and/or information to the third UE 585.

In some aspects, a receiving UE (e.g., the third UE 585) may include a receiver equipped with interference cancellation (IC) capabilities (e.g., an IC-capable receiver). Interference in wireless communication may denote distortions and/or modifications to a first signal, such as a second signal that overlaps in time and/or frequency with the first signal such that the second signal appears as distortion in the first signal at a receiver. Interference cancellation may denote techniques and/or apparatuses that identify and remove the distortion from the first signal, which may improve recovery of information at the receiver. As one example, interference cancellation may include recovering first information (e.g., a first message) from a received signal and using knowledge about the first information to perform interference cancellation on the received signal (e.g., remove distortion from the received signal based at least in part on the first information). After removing the first information from the received signal, an IC-capable receiver may recover second information (e.g., a second message) from the modified received signal. Thus, an IC-capable receiver may include capabilities that can recover information from signals with more distortion relative to an IC-incapable receiver that excludes the IC capabilities.

A wireless system that uses IC-capable receivers may overlap transmissions based at least in part on the IC-capable receivers having an ability to remove interference from a received signal. An IC-capable receiver may also recover more information from the overlapped transmissions, relative to IC-incapable receivers as further described. The ability to overlap transmissions may increase a capacity of the wireless system, improve data throughput, and reduce data-transfer latencies. As an example, using IC-capable receivers may enable a sidelink communication system to increase a quantity of broadcast, multicast, and/or unicast messages by overlapping sidelink transmissions and/or using a resource for multiple transmissions.

Resource selection performed for a sidelink communication system that may include both IC-capable and IC-incapable receivers may sometimes result in inefficiencies that waste resources, reduce data throughput, and/or increase data-transfer latencies. To illustrate, to select resources for a sidelink communication, a UE may use a threshold based at least in part on an IC-incapable receiver that has a lower tolerance to interference relative to an IC-capable receiver. Using a threshold based at least in part on the IC-incapable receiver may help ensure that sidelink communications are recoverable by both an IC-capable receiver and an IC-incapable receiver. However, the threshold associated with the IC-incapable receiver may also result in the UE identifying some resources as being occupied that could instead be considered available for sidelink transmissions to the IC-capable receiver. Thus, using a threshold associated with the IC-incapable receiver may waste resources, reduce data throughput, and/or increase data transfer-latencies.

Some techniques and apparatuses described herein provide sidelink resource allocation using interference cancellation capabilities. A UE may receive capability information from one or more other UEs over a sidelink channel. In some aspects, the capability information may indicate IC capabilities. To illustrate, capability information from a first UE may indicate that the first UE includes a receiver with IC capabilities (e.g., an IC-capable receiver). Alternatively or additionally, capability information from a second UE may indicate that the second UE includes a receiver that is unequipped with IC capabilities (e.g., an IC-incapable receiver). In some aspects, the UE may receive sidelink control information (SCI) from the one or more other UEs that indicates sidelink resource reservation information in a resource selection window associated with the UE. Based at least in part on a pending communication to one of the other UEs, the UE may transmit an indication of one or more reserved resources for sidelink communications. In some aspects, the one or more reserved resources may be based at least in part on the IC capabilities and the sidelink resource reservation information.

As one example, the UE may select the one or more reserved resources from a resource selection window resource based at least in part on a first pending communication for an IC-incapable receiver and/or a second pending communication for an IC-capable receiver. In some aspects, the UE may select the one or more reserved resources based at least in part on using a first exclusion threshold associated with the IC-incapable receiver and/or a second exclusion threshold associated with the IC-capable receiver. The first exclusion threshold may be based at least in part on a first interference level in a signal at which the IC-incapable receiver may recover information within a performance threshold (e.g., with an acceptable percentage of recovery error). The second exclusion threshold may be based at least in part on a second interference level in a signal at which the IC-capable receiver may recover information from a signal within the performance threshold. In some aspects, the second exclusion threshold is associated with more interference relative to the first exclusion threshold.

By using multiple exclusion thresholds, the UE may identify resources for the second pending communication to the IC-capable receiver that would otherwise be considered occupied based at least in part on using a single exclusion threshold associated with the IC-incapable receiver. To illustrate, the UE may identify a resource in the resource selection window that has an interference level associated with recovery errors at an IC-incapable receiver but is considered an acceptable interference level (e.g., within the performance threshold) at an IC-capable receiver. The multiple exclusion thresholds enable the UE to select resources based at least in part on the different capabilities of the receivers and increase a number of selected resources. The ability to select more resources may help reduce resource waste, increase data throughput, and/or reduce data transfer latencies in the sidelink communication network.

As indicated above, FIG. 5 is provided as an example. Other examples may differ from what is described with respect to FIG. 5.

Figure 6:
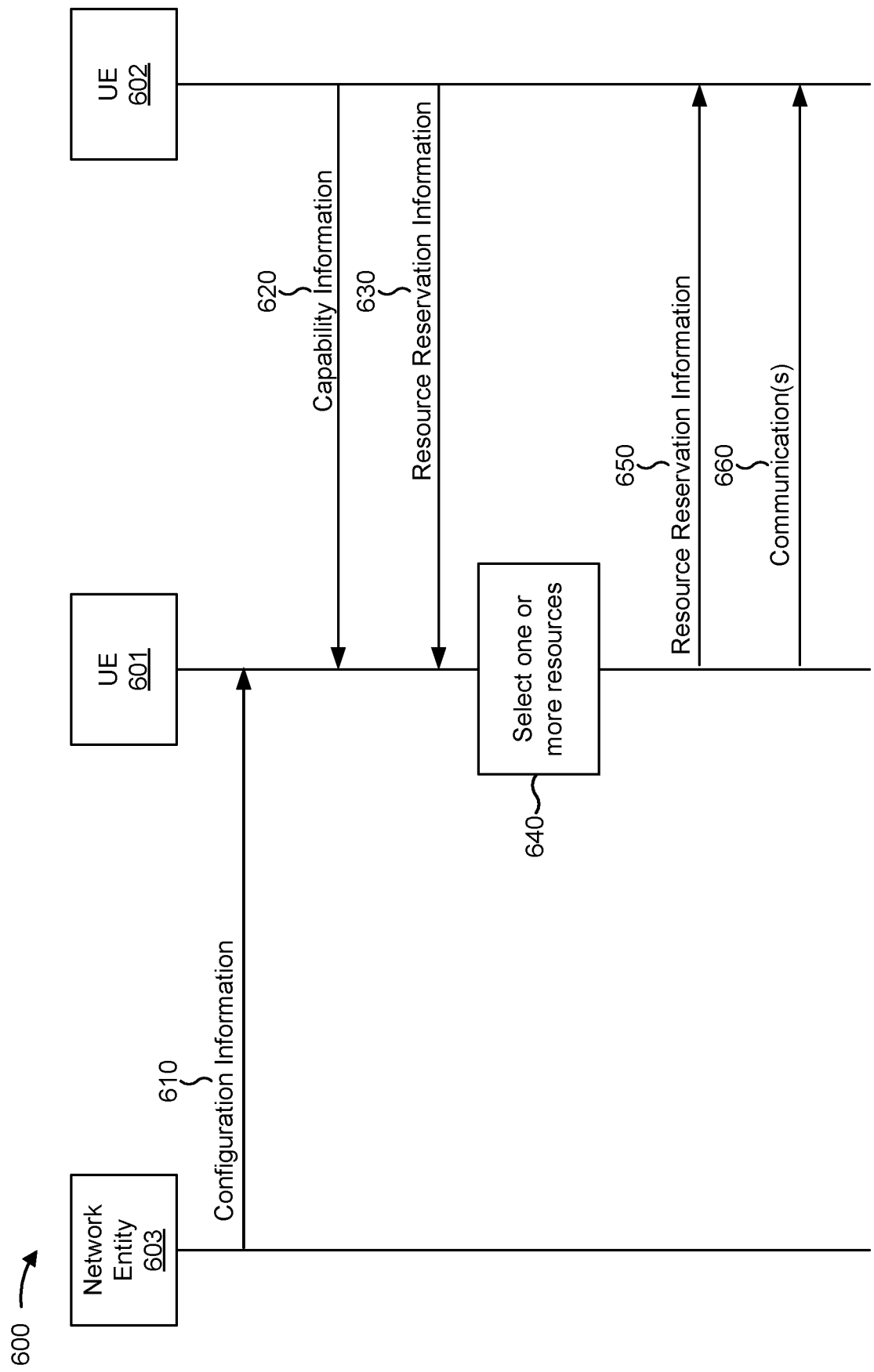
FIG. 6 is a diagram illustrating an example of a wireless communication process between a first UE, a second UE 602, and a network entity in a sidelink communication network, in accordance with the present disclosure.

FIG. 6 is a diagram illustrating an example 600 of a wireless communication process between a first UE 601 (e.g., a UE 120 or an apparatus 800), a second UE 602 (e.g., another UE 120 or another apparatus 800), and a network entity 603 (e.g., a base station 110) in a sidelink communication network, in accordance with the present disclosure. In some aspects, the first UE 601 may be a UE reserving resources in a sidelink communication network based at least in part on operating in a Mode 2 transmission mode, as further described with regard to FIG. 3 and FIG. 5. While the example 600 shows a network entity and two UEs participating in the wireless communication process, other examples may exclude the network entity and/or include additional UEs.

As shown by reference number 610, the network entity 603 may transmit, and the first UE 601 may receive, configuration information. To illustrate, the network entity 603 may transmit a radio resource control (RRC) message that includes configuration information associated with resource selection in a sidelink communication network. Some examples of configuration information may include a first exclusion threshold value associated with an IC-incapable receiver, a second exclusion threshold value associated with an IC-capable receiver, a first step increment value associated with the first exclusion threshold, a second step increment value associated with the second exclusion threshold, a common step increment value, a common exclusion threshold value, a sensing window time duration and/or frequency span, a resource selection window time duration and/or frequency span, and/or a time offset between a sensing window and a resource selection window. In some aspects, the network entity 603 may be a V2X network entity or a base station. In other aspects, the network entity 603 may be another UE.

As shown by reference number 620, the second UE 602 may transmit, and the first UE 601 may receive, capability information. The capability information may indicate that the second UE 602 includes an IC-capable receiver or indicate that the second UE 602 includes an IC-incapable receiver. However, the capability information may include alternative or additional information. While the example 600 shows a single UE transmitting capability information to the first UE 601, other examples may include multiple UEs transmitting capability information to the first UE 601.

As shown by reference number 630, the second UE 602 may transmit, and the first UE 601 may receive, resource reservation information associated with the second UE 602. As one example, the second UE 602 may transmit an indication of one or more resources reserved by the second UE 602 in a resource selection window. To illustrate, the second UE 602 may transmit an index value that maps to a time slot and/or frequency partition in the resource selection window. In some aspects, the second UE 602 may transmit the resource reservation information in SCI, as further described with regard to FIG. 5. In some aspects, a type of resource (e.g., a resource from a particular resource pool) used for the reserved resource may indicate whether the reserved resource is designated for an IC-capable and/or an IC-incapable receiver. Alternatively, the SCI may indicate whether the reserved resource is designated for an IC-capable and/or an IC-incapable receiver based at least in part on a resource pool associated with the reserved resource as further described below.

As shown by reference number 640, the first UE 601 may select one or more resources to reserve for one or more pending (sidelink) communications. As one example, the first UE 601 may identify and/or receive a resource selection trigger associated with having one or more pending communications to transmit over a sidelink channel. In some aspects, the first UE 601 may select a resource from a resource selection window based at least in part on using a first exclusion threshold associated with an IC-incapable receiver and/or using a second exclusion threshold associated with an IC-capable receiver. To illustrate, the first UE 601 may select a first resource from the resource selection window resources based at least in part on identifying that a first measurement result associated with the first resource satisfies the first exclusion threshold (e.g., the first measurement result indicates that an interference level associated with the first resource is below the first exclusion threshold) and based at least in part on the first UE 601 having a pending communication to an IC-incapable receiver. Alternatively or additionally, the first UE 601 may select a second resource from the resource selection window resources based at least in part on identifying that a second measurement result associated with the second resource satisfies the second exclusion threshold and that the first UE 601 has a pending communication to an IC-capable receiver.

In some aspects, the resource selection window resources may be associated with multiple resource pools. As one example, a resource selection window (e.g., the resource selection window 530) may include a first resource pool designated for communications with an IC-incapable receiver and a second resource pool designated for communications with an IC-capable receiver. The first resource pool and the second resource pool may span a same time duration and different frequencies, different time durations and different frequencies, or different time durations and same frequencies. Thus, a resource selection window may include contiguous and/or non-contiguous resources. In some aspects, the first UE 601 may use the first exclusion threshold to select a resource from a resource pool associated with an IC-incapable receiver and the second exclusion threshold to select from a resource pool associated with an IC-capable receiver.

The first UE 601 may select the one or more resources from the resource selection window resources based at least in part on an availability threshold. An availability threshold may indicate a percentage or number of available resources within the resource selection window. Alternatively or additionally, the availability threshold may indicate a percentage or number of available resources needed by the first UE 601 to reserve for the sidelink communications. An available resource may denote a resource identified as being available for sidelink communications, such as a resource with an associated measurement result and/or signal metric that satisfies an exclusion threshold. To select the resources based at least in part on the availability threshold, the first UE 601 may determine whether a total number of available resources satisfies the availability threshold. To illustrate, for an availability threshold of 20%, the first UE 601 may analyze the resource selection window resources to determine whether a total number of available resources (e.g., identified based at least in part on the first exclusion threshold and/or the second exclusion threshold) satisfies the 20% availability threshold. In some aspects, the first UE 601 may select a subset of resources from the total number of available resources to reserve for sidelink communications. For instance, the first UE 601 may randomly select 5 resources from the total number of available resources (e.g., where the total number of resources is equal to or greater than 5). Alternatively or additionally, the first UE 601 may select the resources to reserve based at least in part on signal metrics, such as by selecting 5 available resources with better RSRP relative to other available resources.

In some aspects, the first UE 601 may iteratively select one or more resources from the resource selection window resources and/or a set of one or more available resources from the resource selection window resources. To illustrate, the first UE 601 may initialize the first exclusion threshold and the second exclusion threshold to a same value or to different values.

The first UE 601 may use the initialized first and second exclusion thresholds in a first iteration of a resource sensing procedure. If a total number of available resources identified in the first iteration of the resource sensing procedure fails to satisfy the availability threshold and/or a total number of reserved resources fails satisfy the needs of the first UE 601 (e.g., the total number of reserved resources fails to satisfy the availability threshold and the availability threshold indicates a number of resources needed by the first UE 601), the first UE 601 may increase the first exclusion threshold by a first step increment and/or increase the second exclusion threshold by a second step increment. The first UE 601 may then use the increased first exclusion threshold and/or the increased second exclusion threshold in subsequent iterations of the resource sensing procedure. Thus, the first UE 601 may repeatedly increase the first and/or second exclusion thresholds to analyze one or more unselected resource selection window resources (e.g., resources that have not been selected as reserved resources). The first step increment and the second step increment may have a same value or different values. As one example, the first exclusion threshold and the second exclusion threshold may be associated with an RSRP value with a unit of decibels (dB), the first step increment may be initialized to a value of 3 decibels (dB), and the second step increment may be initialized to a value of 6 dB (or vice versa).

In some aspects, the first UE 601 may repeatedly increase the first exclusion threshold and/or the second exclusion threshold until the total number of the available resources in the resource selection window satisfies the availability threshold and/or until at least one of the exclusion thresholds (e.g., the increased first and/or second exclusion threshold) satisfies a limit threshold. The first UE 601 may increase the first exclusion threshold and the second exclusion threshold in a same or different iteration of the resource sensing procedure. As one example, the first UE 601 may initially increase the second exclusion threshold associated with the IC-capable receiver based at least in part on having a pending communication to the IC-capable receiver and identifying that a total number of available resources fails to satisfy the availability threshold. The first UE 601 may then analyze one or more unreserved resource selection window resources using the incremented second exclusion threshold and determine whether an unreserved resource selection window resource may be considered an available resource. Alternatively or additionally, the first UE 601 may determine whether to selectively include the unreserved resource selection window resource to the available resources and/or the reserved resources. Selectively including a resource to the available resources and/or reserved resources may denote (1) adding the resource to the available and/or reserved resources based at least in part on an associated measurement result and/or signal metric satisfying an exclusion threshold (e.g., having a value below the exclusion threshold) and/or (2) excluding the resource from the available and/or reserved resources based at least in part on the associated measurement result and/or signal metric failing to satisfy the exclusion threshold (e.g., having a value at or above the exclusion threshold).

The first UE 601 may repeatedly increase the second exclusion threshold until the total number of available resources satisfies the availability threshold or the second exclusion threshold satisfies the limit threshold. If the total number of available resources fails to satisfy the availability threshold and the second exclusion threshold reaches and/or satisfies the limit threshold, the first UE 601 may then increase (e.g., repeatedly) the first exclusion threshold associated with the IC-incapable receiver until the total number of reserved resources satisfies the availability threshold or the first exclusion threshold satisfies a limit threshold (e.g., either a same limit threshold applied to the second exclusion threshold or another limit threshold).

In analyzing a resource, the first UE 601 may calculate one or more measurement results and/or signal metrics based at least in part on the resource as further described with regard to FIG. 3 and FIG. 5. For example, the first UE 601 may calculate the measurement result and/or signal metric based at least in part on an association between a resource in the resource selection window and a resource in the sensing window. The first UE 601 may calculate, as the measurement result, an RSRP metric for an unselected resource selection window resource and compare the RSRP metric to the increased first and/or second exclusion threshold. For example, the first UE 601 may compare the RSRP metric to one or more RSRP exclusion thresholds (e.g., an exclusion threshold based at least in part on RSRP). Based at least in part on the comparison, the first UE 601 may determine whether to consider the unselected resource selection window resource as an available resource and/or whether to selectively include the unselected resource selection window resource to the available resources and/or reserved resources.

In some aspects, the first UE 601 may calculate a combined signal metric based at least in part on multiple UEs. To illustrate, the first UE 601 may calculate a first RSRP metric for the second UE 602 and a second RSRP metric for another UE. The first UE 601 may calculate a combined signal metric by combining the first and second RSRP metrics. For example, a first RSRP metric of −40 decibel-milliwatts (dBm) combined with a second RSRP metric of −42 dBm may be added together to generate a combined RSRP metric of −37.9 dBm (e.g., by converting logarithmic values to linear scale values, calculating a combined linear scale value, and converting the combined linear scale value to a logarithmic scale value).

The first UE 601 may identify a resource to include in the one or more available resources and/or as a resource to reserve for sidelink communication based at least in part on the combined signal metric. For example, the first UE 601 may determine whether to selectively include a resource to the reserved resources (and/or identify the resource as being an available resource) based at least in part on calculating a combined signal metric and comparing the combined signal metric to the first exclusion threshold associated with the IC-incapable receiver and/or the second exclusion threshold associated with the IC-capable receiver. For example, the first UE 601 may compare the combined signal metric to one or more RSRP exclusion thresholds (e.g., an exclusion threshold based at least in part on RSRP). The combined signal metric may provide a more accurate estimation of interference levels in a resource relative to an individual signal metric. Thus, the combined signal metric may enable the first UE 601 to identify a resource associated with an interference level that may cause recovery errors at a receiver that would otherwise be reserved using the individual signal metrics.

In some aspects, if a total number of available resources and/or reserved resources identified in a first iteration of a resource sensing procedure fails to satisfy the availability threshold, the first UE 601 may prioritize resource selection. As one example, the first UE 601 may prioritize communicating with an IC-capable receiver higher than communicating with an IC-incapable receiver. Based at least in part on the prioritization, the first UE 601 may initially select a resource for sidelink communication to the IC-capable receiver and, if resources are available after fulfilling resources for the sidelink communication to the IC-capable receiver, subsequently select a resource for sidelink communication to the IC-incapable receiver. While a single IC-capable receiver and a single IC-incapable receiver are described herein, the first UE 601 may prioritize all sidelink communications to multiple IC-capable receivers higher than sidelink communications to multiple IC-incapable receivers. Prioritizing resource selection based at least in part on communications to the IC-capable receiver may increase resource selection and, subsequently, data throughput in the sidelink communication network. Prioritizing the resource selection may also reduce data-transfer latencies. To illustrate, the prioritization may enable selection of a resource associated with an interference level that may cause recovery errors at an IC-incapable receiver, but not an IC-capable receiver.

In some aspects, the first UE 601 may select a subset of resources from the one or more available resources as the one or more reserved resources for sidelink communications. For instance, the first UE 601 may select 5 resources from the available resources to reserve for sidelink communications randomly or based at least in part on signal metrics as further described above.

As shown by reference number 650, the first UE 601 may transmit, and the second UE 602 may receive, resource reservation information. As one example, the first UE 601 may transmit the resource reservation information in SCI as described with regard to the reference number 630. The first UE 601 may transmit the resource reservation information using a broadcast message (e.g., to multiple UEs), a multicast message (e.g., to a select group of UEs), and/or as a unicast message to a single UE. While the example 600 shows the first UE 601 transmitting the resource reservation information to the second UE 602, other examples may include the first UE 601 transmitting the resource reservation information to alternate or additional UEs. In some aspects, the first UE 601 may transmit, in the resource reservation information, an indication of which resources are intended for an IC-capable receiver. The resource reservation information may be based at least in part on the selecting performed by the first UE 601, as shown by the reference number 640, and indicate resources reserved by the first UE 601. The indication may be explicit (e.g., a toggle field, a Boolean, or an identifier associated with indicating an IC-capable receiver) or implicit (e.g., selection of a resource in a resource pool associated with IC-capable receivers and not IC-incapable receivers).

As shown by reference number 660, the first UE 601 may transmit, and the second UE 602 may receive, one or more communications based at least in part on the reserved resources. To illustrate, the first UE 601 may transmit the communication(s) using one or more of the reserved resources. The communication(s) may include data and/or control information. While the example 600 shows the first UE 601 transmitting the communication(s) to the second UE 602, other examples may include the first UE 601 transmitting the communication(s) to alternate or additional UEs.

By using multiple exclusion thresholds, the UE may identify resources for communications to IC-capable receivers that may otherwise be excluded based at least in part on a single exclusion threshold associated with an IC-incapable receiver. The multiple exclusion thresholds enable the UE to select resources based upon the different capabilities of the receivers and select more resources based at least in part on an increased tolerance to interference by the IC-capable receivers. The increased resource selection may help reduce resource waste, increase data throughput, and/or reduce data transfer-latencies in the sidelink communication network.

As indicated above, FIG. 6 is provided as an example. Other examples may differ from what is described with respect to FIG. 6.

Figure 7:
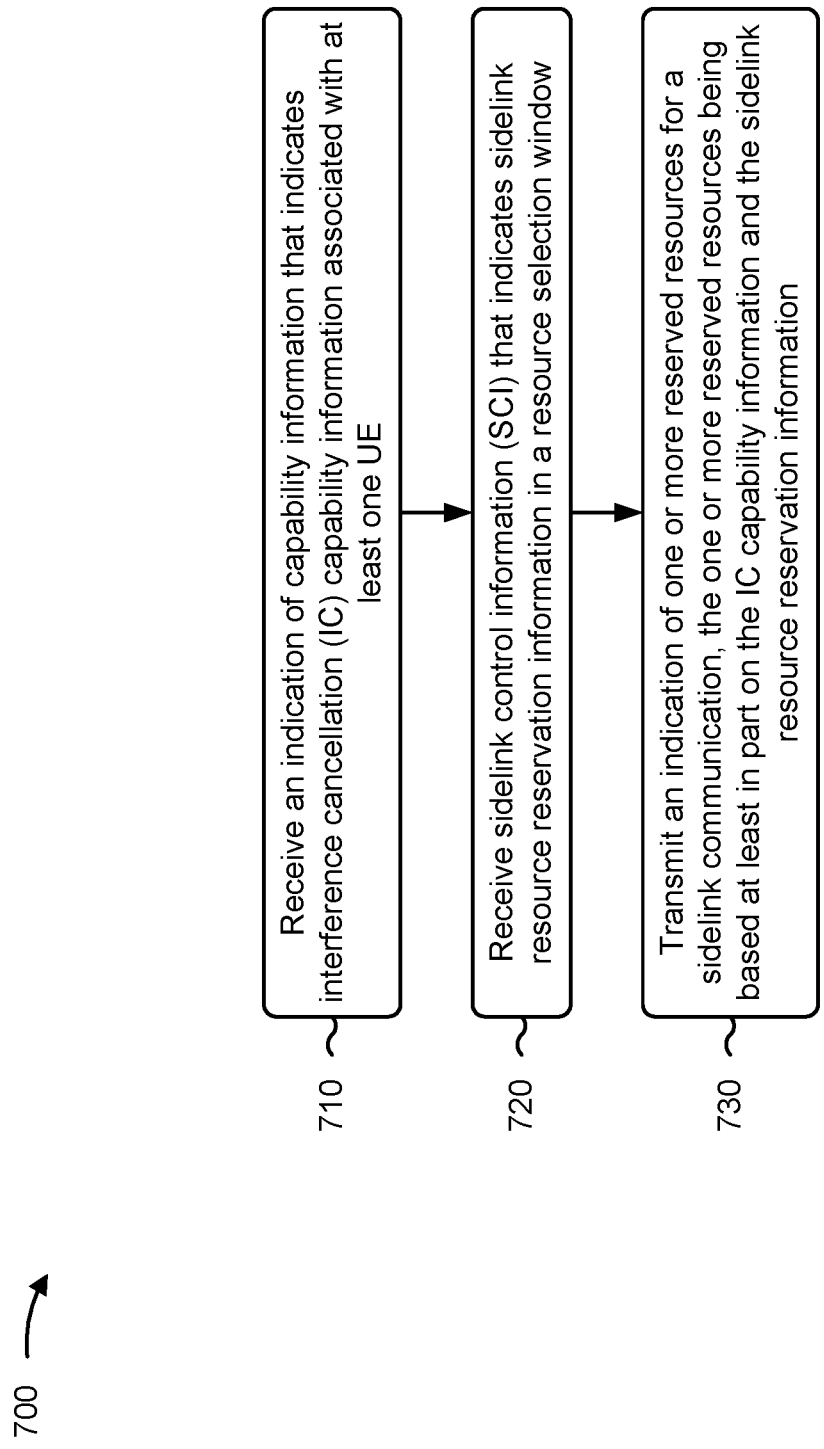
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with sidelink resource allocation using interference cancellation capabilities.

As shown in FIG. 7, in some aspects, process 700 may include receiving a first indication of capability information that indicates IC capability information associated with at least one UE (block 710). For example, the UE (e.g., using communication manager 140 and/or reception component 802, depicted in FIG. 8) may receive a first indication of capability information that indicates IC capability information associated with at least one UE, as described above.

As further shown in FIG. 7, in some aspects, process 700 may include receiving SCI that indicates sidelink resource reservation information in a resource selection window (block 720). For example, the UE (e.g., using communication manager 140 and/or reception component 802, depicted in FIG. 8) may receive SCI that indicates sidelink resource reservation information in a resource selection window, as described above.

As further shown in FIG. 7, in some aspects, process 700 may include transmitting a second indication of one or more reserved resources for a sidelink communication, the one or more reserved resources being based at least in part on the IC capability information and the sidelink resource reservation information (block 730). For example, the UE (e.g., using communication manager 140 and/or transmission component 804, depicted in FIG. 8) may transmit a second indication of one or more reserved resources for a sidelink communication, the one or more reserved resources being based at least in part on the IC capability information and the sidelink resource reservation information, as described above.

Process 700 may include additional aspects, such as any single aspect or any combination of aspects described below and/or in connection with one or more other processes described elsewhere herein.

In a first aspect, process 700 includes selecting, as one of the one or more reserved resources, a resource selection window resource from one or more resource selection window resources based at least in part on a first exclusion threshold associated with communicating with an IC-incapable receiver and a second exclusion threshold associated with communicating with an IC-capable receiver.

In a second aspect, alone or in combination with the first aspect, selecting the resource selection window resource further comprises selecting a first resource from one or more available resources in the resource selection window as one of the one or more reserved resources based at least in part on the first exclusion threshold and a first pending communication for the IC-incapable receiver, or selecting a second resource from the one or more available resources as one of the one or more reserved resources based at least in part on the second exclusion threshold and a second pending communication for the IC-capable receiver.

In a third aspect, alone or in combination with one or more of the first and second aspects, a total number of the one or more available resources fails to satisfy an availability threshold, and process 700 includes increasing the first exclusion threshold by a first step increment or the second exclusion threshold by a second step increment, and determining whether to include an unselected resource selection window resource, of the one or more resource selection window resources, in the one or more available resources based at least in part on comparing a signal metric associated with the unselected resource selection window resource to the increased first exclusion threshold or the increased second exclusion threshold.

In a fourth aspect, alone or in combination with one or more of the first through third aspects, the first step increment and the second step increment are initialized to different values.

In a fifth aspect, alone or in combination with one or more of the first through fourth aspects, the first step increment and the second step increment are initialized to a same value.

In a sixth aspect, alone or in combination with one or more of the first through fifth aspects, the first step increment and the second step increment are initialized to different values.

In a seventh aspect, alone or in combination with one or more of the first through sixth aspects, process 700 includes receiving configuration information that indicates the first step increment and the second step increment.

In an eighth aspect, alone or in combination with one or more of the first through seventh aspects, process 700 includes receiving the configuration information in a radio resource control (RRC) message.

In a ninth aspect, alone or in combination with one or more of the first through eighth aspects, selecting the resource selection window resource further comprises calculating a signal metric for the resource selection window resource, comparing the signal metric to the first exclusion threshold or the second exclusion threshold, and determining whether to include the resource selection window resource in a set of one or more available resources in the resource selection window based at least in part on the comparing.

In a tenth aspect, alone or in combination with one or more of the first through ninth aspects, the first exclusion threshold is a first reference signal received power (RSRP) exclusion threshold, the second exclusion threshold is a second RSRP exclusion threshold, and the signal metric is an RSRP metric.

In an eleventh aspect, alone or in combination with one or more of the first through tenth aspects, process 700 includes selectively including the resource selection window resource in the set of one or more available resources based at least in part on the signal metric satisfying the first exclusion threshold or the second exclusion threshold.

In a twelfth aspect, alone or in combination with one or more of the first through eleventh aspects, process 700 includes receiving configuration information that indicates the first exclusion threshold and the second exclusion threshold.

In a thirteenth aspect, alone or in combination with one or more of the first through twelfth aspects, process 700 includes receiving the configuration information in an RRC message.

In a fourteenth aspect, alone or in combination with one or more of the first through thirteenth aspects, selecting the resource selection window resource further comprises selecting the resource selection window resource from one or more available resources in the resource selection window.

In a fifteenth aspect, alone or in combination with one or more of the first through fourteenth aspects, a total number of the one or more available resources fails to satisfy an availability threshold, and process 700 includes determining to include the resource selection window resource in the one or more available resources based at least in part on prioritizing communicating with the IC-capable receiver higher than communicating with the IC-incapable receiver.

In a sixteenth aspect, alone or in combination with one or more of the first through fifteenth aspects, process 700 includes calculating a combined RSRP metric for the resource selection window resource, and wherein selecting the resource selection window resource is based at least in part on the combined RSRP metric.

In a seventeenth aspect, alone or in combination with one or more of the first through sixteenth aspects, selecting the resource selection window resource further comprises comparing the combined RSRP metric for the resource selection window resource and at least one of the first exclusion threshold or the second exclusion threshold, and selectively including the resource selection window resource in the one or more reserved resources based at least in part on the comparing.

In an eighteenth aspect, alone or in combination with one or more of the first through seventeenth aspects, the second indication of the one or more reserved resources indicates which resources of the one or more reserved resources are intended for an IC-capable receiver.

In a nineteenth aspect, alone or in combination with one or more of the first through eighteenth aspects, process 700 includes determining whether to include at least one resource selection window resource, of one or more resource selection window resources, in a set of one or more available resources based at least in part on an exclusion threshold, identifying that a total number of available resources in the set of one or more available resources fails to satisfy an availability threshold, increasing the exclusion threshold by a step increment based at least in part on identifying that the total number fails to satisfy the availability threshold, and analyzing an unselected resource selection window resource, of the one or more resource selection window resources, based at least in part on the increased exclusion threshold.

In a twentieth aspect, alone or in combination with one or more of the first through nineteenth aspects, the exclusion threshold is associated with an IC-capable receiver, and wherein analyzing the unselected resource selection window resource based at least in part on the increased exclusion threshold further comprises determining whether to include the unselected resource selection window resource in the set of one or more available resources as a resource for a pending communication to the IC-capable receiver.

In a twenty-first aspect, alone or in combination with one or more of the first through twentieth aspects, process 700 includes including the unselected resource selection window resource in the set of one or more available resources.

In a twenty-second aspect, alone or in combination with one or more of the first through twenty-first aspects, process 700 includes repeatedly increasing the exclusion threshold by the step increment and analyzing one or more unselected resource selection window resources of the one or more resource selection window resources until the total number of available resources in the set of one or more available resources satisfies the availability threshold, or the exclusion threshold satisfies a limit threshold.

In a twenty-third aspect, alone or in combination with one or more of the first through twenty-second aspects, a first exclusion threshold is associated with communicating with an IC-incapable receiver, wherein the exclusion threshold is a second exclusion threshold, and process 700 includes increasing the first exclusion threshold by the step increment or another step increment based at least in part on the second exclusion threshold satisfying the limit threshold, and the total number of available resources in the set of one or more available resources failing to satisfy the availability threshold, and analyzing the one or more unselected resource selection window resources based at least in part on the increased first exclusion threshold.

In a twenty-fourth aspect, alone or in combination with one or more of the first through twenty-third aspects, process 700 includes selecting the one or more reserved resources from the one or more available resources.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
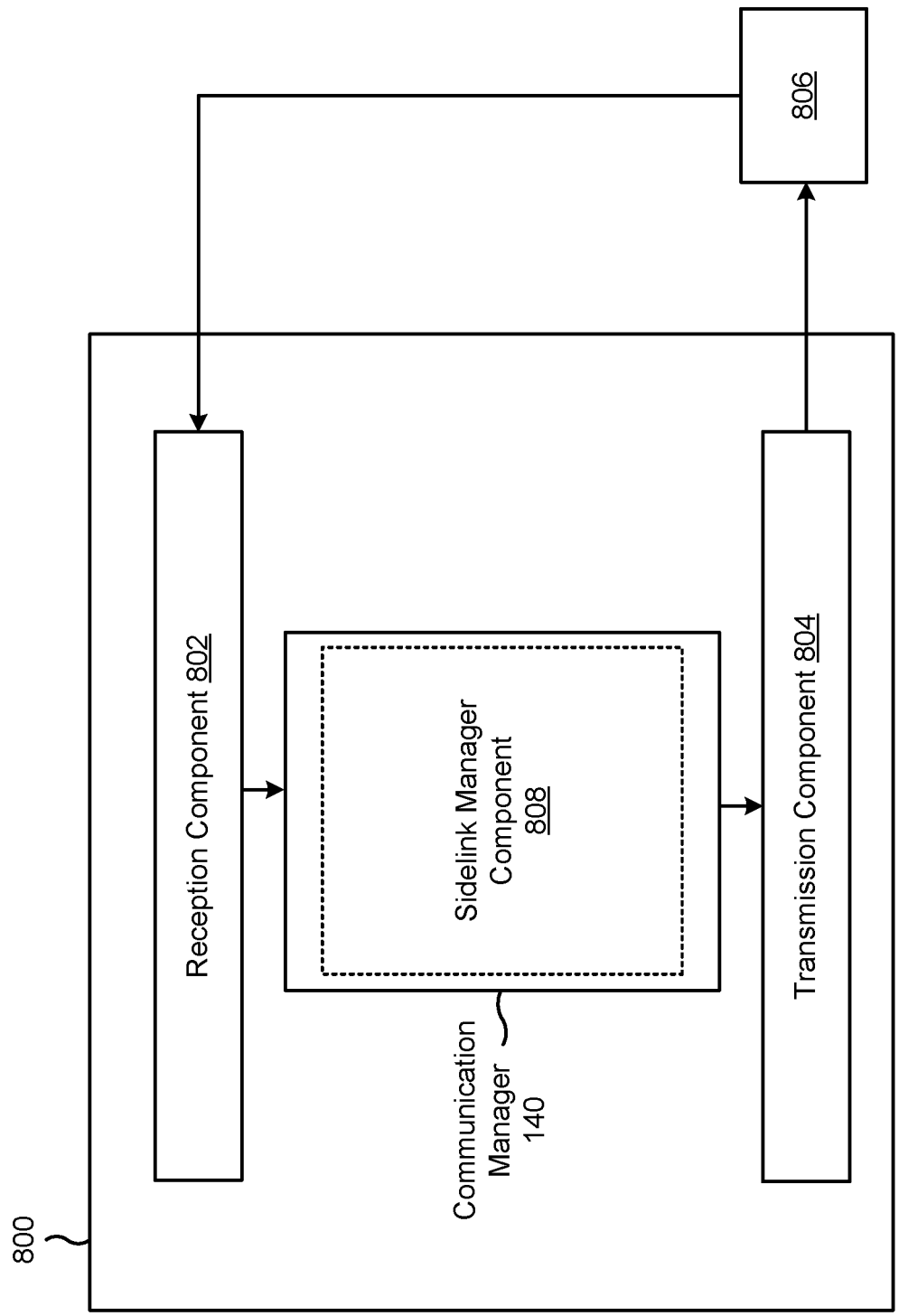
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of a sidelink manager component 808, among other examples.

In some aspects, the apparatus 800 may be configured to perform one or more operations described herein in connection with FIGS. 3-6. Additionally, or alternatively, the apparatus 800 may be configured to perform one or more processes described herein, such as process 700 of FIG. 7, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive a first indication of capability information that indicates IC capability information associated with at least one UE. The reception component 802 may receive SCI that indicates sidelink resource reservation information in a resource selection window. The transmission component 804 may transmit a second indication of one or more reserved resources for a sidelink communication, the one or more reserved resources being based at least in part on the IC capability information and the sidelink resource reservation information.

The sidelink manager component 808 may select, as one of the one or more reserved resources, a resource selection window resource from one or more resource selection window resources based at least in part on a first exclusion threshold associated with communicating with an IC-incapable receiver and a second exclusion threshold associated with communicating with an IC-capable receiver.

The reception component 802 may receive configuration information that indicates the first step increment and the second step increment.

The reception component 802 may receive the configuration information in an RRC message.

The sidelink manager component 808 selectively include the resource selection window resource in the set of one or more available resources based at least in part on the signal metric satisfying the first exclusion threshold or the second exclusion threshold.

The reception component 802 may receive configuration information that indicates the first exclusion threshold and the second exclusion threshold.

The reception component 802 may receive the configuration information in an RRC message.

The sidelink manager component 808 may calculate a combined RSRP metric for the resource selection window resource.

The sidelink manager component 808 may determine whether to include at least one resource selection window resource, of one or more resource selection window resources, in a set of one or more available resources based at least in part on an exclusion threshold.

The sidelink manager component 808 may identify that a total number of available resources in the set of one or more available resources fails to satisfy an availability threshold.

The sidelink manager component 808 may increase the exclusion threshold by a step increment based at least in part on identifying that the total number fails to satisfy the availability threshold.

The sidelink manager component 808 may analyze an unselected resource selection window resource, of the one or more resource selection window resources, based at least in part on the increased exclusion threshold.

The sidelink manager component 808 may include the unselected resource selection window resource in the set of one or more available resources.

The sidelink manager component 808 may repeatedly increase the exclusion threshold by the step increment and analyze one or more unselected resource selection window resources of the one or more resource selection window resources until the total number of available resources in the set of one or more available resources satisfies the availability threshold; or the exclusion threshold satisfies a limit threshold.

The sidelink manager component 808 may select the one or more reserved resources from the one or more available resources.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving a first indication of capability information that indicates interference cancellation (IC) capability information associated with at least one UE; receiving sidelink control information (SCI) that indicates sidelink resource reservation information in a resource selection window; and transmitting a second indication of one or more reserved resources for a sidelink communication, the one or more reserved resources being based at least in part on the IC capability information and the sidelink resource reservation information.

Aspect 2: The method of Aspect 1, further comprising: selecting, as one of the one or more reserved resources, a resource selection window resource from one or more resource selection window resources based at least in part on a first exclusion threshold associated with communicating with an IC-incapable receiver and a second exclusion threshold associated with communicating with an IC-capable receiver.

Aspect 3: The method of Aspect 2, wherein selecting the resource selection window resource further comprises: selecting a first resource from one or more available resources in the resource selection window as one of the one or more reserved resources based at least in part on the first exclusion threshold and a first pending communication for the IC-incapable receiver; or selecting a second resource from the one or more available resources as one of the one or more reserved resources based at least in part on the second exclusion threshold and a second pending communication for the IC-capable receiver.

Aspect 4: The method of Aspect 3, wherein a total number of the one or more available resources fails to satisfy an availability threshold, and the method further comprises: increasing the first exclusion threshold by a first step increment or the second exclusion threshold by a second step increment; and determining whether to include an unselected resource selection window resource, of the one or more resource selection window resources, in the one or more available resources based at least in part on comparing a signal metric associated with the unselected resource selection window resource to the increased first exclusion threshold or the increased second exclusion threshold.

Aspect 5: The method of Aspect 4, wherein, prior to increasing the first exclusion threshold or the second exclusion threshold, the first exclusion threshold and the second exclusion threshold are initialized to a same value, and wherein the first step increment and the second step increment are initialized to different values.

Aspect 6: The method of Aspect 4, wherein, prior to increasing the first exclusion threshold or the second exclusion threshold, the first exclusion threshold and the second exclusion threshold are initialized to different values, and wherein the first step increment and the second step increment are initialized to a same value.

Aspect 7: The method of Aspect 4, wherein, prior to increasing the first exclusion threshold or the second exclusion threshold, the first exclusion threshold and the second exclusion threshold are initialized to different values, and wherein the first step increment and the second step increment are initialized to different values.

Aspect 8: The method of any one of Aspects 4-7, further comprising: receiving configuration information that indicates the first step increment and the second step increment.

Aspect 9: The method of Aspect 8, further comprising: receiving the configuration information in a radio resource control (RRC) message.

Aspect 10: The method of any one of Aspects 2-9, wherein selecting the resource selection window resource further comprises: calculating a signal metric for the resource selection window resource; comparing the signal metric to the first exclusion threshold or the second exclusion threshold; and determining whether to include the resource selection window resource in a set of one or more available resources in the resource selection window based at least in part on the comparing.

Aspect 11: The method of Aspect 10, wherein the first exclusion threshold is a first reference signal received power (RSRP) exclusion threshold, the second exclusion threshold is a second RSRP exclusion threshold, and the signal metric is an RSRP metric.

Aspect 12: The method of Aspect 10 or Aspect 11, further comprising: selectively including the resource selection window resource in the set of one or more available resources based at least in part on the signal metric satisfying the first exclusion threshold or the second exclusion threshold.

Aspect 13: The method of any one of Aspects 2-12, further comprising: receiving configuration information that indicates the first exclusion threshold and the second exclusion threshold.

Aspect 14: The method of Aspect 13, further comprising: receiving the configuration information in a radio resource control (RRC) message.

Aspect 15: The method of any one of Aspects 2-14, wherein selecting the resource selection window resource further comprises selecting the resource selection window resource from one or more available resources in the resource selection window.

Aspect 16: The method of Aspect 15, wherein a total number of the one or more available resources fails to satisfy an availability threshold, and the method further comprises: determining to include the resource selection window resource in the one or more available resources based at least in part on prioritizing communicating with the IC-capable receiver higher than communicating with the IC-incapable receiver.

Aspect 17: The method of any one of Aspects 2-16, further comprising: calculating a combined reference signal received power (RSRP) metric for the resource selection window resource, and wherein selecting the resource selection window resource is based at least in part on the combined RSRP metric.

Aspect 18: The method of Aspect 17, wherein selecting the resource selection window resource further comprises: comparing the combined RSRP metric for the resource selection window resource and at least one of the first exclusion threshold or the second exclusion threshold; and selectively including the resource selection window resource in the one or more reserved resources based at least in part on the comparing.

Aspect 19: The method of any one of Aspects 1-18, wherein the second indication of the one or more reserved resources indicates which resources of the one or more reserved resources are intended for an IC-capable receiver.

Aspect 20: The method of any one of Aspects 1-19, further comprising: determining whether to include at least one resource selection window resource, of one or more resource selection window resources, in a set of one or more available resources based at least in part on an exclusion threshold; identifying that a total number of available resources in the set of one or more available resources fails to satisfy an availability threshold; increasing the exclusion threshold by a step increment based at least in part on identifying that the total number fails to satisfy the availability threshold; and analyzing an unselected resource selection window resource, of the one or more resource selection window resources, based at least in part on the increased exclusion threshold.

Aspect 21: The method of Aspect 20, wherein the exclusion threshold is associated with an IC-capable receiver, and wherein analyzing the unselected resource selection window resource based at least in part on the increased exclusion threshold further comprises: determining whether to include the unselected resource selection window resource in the set of one or more available resources as a resource for a pending communication to the IC-capable receiver.

Aspect 22: The method of Aspect 21, further comprising: including the unselected resource selection window resource in the set of one or more available resources.

Aspect 23: The method of Aspect 21 or Aspect 22, further comprising: repeatedly increasing the exclusion threshold by the step increment and analyzing one or more unselected resource selection window resources of the one or more resource selection window resources until: the total number of available resources in the set of one or more available resources satisfies the availability threshold; or the exclusion threshold satisfies a limit threshold.

Aspect 24: The method of Aspect 23, wherein a first exclusion threshold is associated with communicating with an IC-incapable receiver, wherein the exclusion threshold is a second exclusion threshold, and wherein the method further comprises: increasing the first exclusion threshold by the step increment or another step increment based at least in part on: the second exclusion threshold satisfying the limit threshold, and the total number of available resources in the set of one or more available resources failing to satisfy the availability threshold; and analyzing the one or more unselected resource selection window resources based at least in part on the increased first exclusion threshold.

Aspect 25: The method of any one of Aspects 22-24, further comprising: selecting the one or more reserved resources from the one or more available resources.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, individually or collectively configured to:
   receive a first indication of capability information that indicates interference cancellation (IC) capability information associated with at least one UE;
   receive sidelink control information (SCI) that indicates sidelink resource reservation information in a resource selection window; and
   transmit a second indication of one or more reserved resources for a sidelink communication, the one or more reserved resources being based on the IC capability information and the sidelink resource reservation information, the second indication indicating which resources of the one or more reserved resources are intended for an IC-capable receiver that is different from the UE.

2. The apparatus of claim 1, wherein the one or more processors are further individually or collectively configured to:
   select, as one of the one or more reserved resources, a resource from one or more resources in the resource selection window based on a first exclusion threshold associated with communicating with an IC-incapable receiver and a second exclusion threshold associated with communicating with the IC-capable receiver.

3. The apparatus of claim 2, wherein the one or more processors, to select the resource, are individually or collectively configured to:
   select a first resource from one or more available resources in the resource selection window as one of the one or more reserved resources based on the first exclusion threshold and a first pending communication for the IC-incapable receiver; or
   select a second resource from the one or more available resources as one of the one or more reserved resources based on the second exclusion threshold and a second pending communication for the IC-capable receiver.

4. The apparatus of claim 3, wherein the one or more processors are further individually or collectively configured to:
   increase the first exclusion threshold by a first step increment or increase the second exclusion threshold by a second step increment; and
   determine whether to include an unselected resource, of the one or more resources in the resource selection window, in the one or more available resources based at least in part on comparing a signal metric associated with the unselected resource to the increased first exclusion threshold or the increased second exclusion threshold.

5. The apparatus of claim 4, wherein the one or more processors are further individually or collectively configured to:
   receive configuration information that indicates the first step increment and the second step increment.

6. The apparatus of claim 2, wherein the one or more processors, to select the resource, are individually or collectively configured to:
   calculate a signal metric for the resource;
   compare the signal metric to the first exclusion threshold or the second exclusion threshold; and
   determine whether to include the resource in a set of one or more available resources in the resource selection window based at least in part on comparing the signal metric to the first exclusion threshold or the second exclusion threshold.

7. The apparatus of claim 6, wherein the first exclusion threshold is a first reference signal received power (RSRP) exclusion threshold, the second exclusion threshold is a second RSRP exclusion threshold, and the signal metric is an RSRP metric.

8. The apparatus of claim 2, wherein the one or more processors are further individually or collectively configured to:
   receive configuration information that indicates the first exclusion threshold and the second exclusion threshold.

9. The apparatus of claim 2, wherein the one or more processors, to select the resource, are individually or collectively configured to select the resource from one or more available resources in the resource selection window.

10. The apparatus of claim 9, wherein the one or more processors are further individually or collectively configured to:
determine to include the resource in the one or more available resources based at least in part on prioritizing communicating with the IC-capable receiver higher than communicating with the IC-incapable receiver.

11. The apparatus of claim 2, wherein the one or more processors are further individually or collectively configured to:
calculate a combined reference signal received power (RSRP) metric for the resource, and
wherein the one or more processors, to select the resource, are further individually or collectively configured to select the resource based at least in part on the combined RSRP metric.

12. The apparatus of claim 11, wherein the one or more processors, to select the resource, are individually or collectively configured to:
compare the combined RSRP metric for the resource and at least one of the first exclusion threshold or the second exclusion threshold; and
selectively include the resource in the one or more reserved resources based on comparing the combined RSRP metric and at least one of the first exclusion threshold or the second exclusion threshold.

13. The apparatus of claim 1, wherein the one or more processors are further individually or collectively configured to:
determine whether to include at least one resource, of one or more resources in the resource selection window, in a set of one or more available resources based at least in part on an exclusion threshold;
identify that a total number of available resources in the set of one or more available resources fails to satisfy an availability threshold;
increase the exclusion threshold by a step increment based at least in part on identifying that the total number fails to satisfy the availability threshold; and
analyze an unselected resource, of the one or more resources in the resource selection window, based at least in part on the increased exclusion threshold.

14. The apparatus of claim 13, wherein the exclusion threshold is associated with the IC-capable receiver, and
wherein the one or more processors, to analyze the unselected resource based at least in part on the increased exclusion threshold, are individually or collectively configured to:
determine whether to include the unselected resource in the set of one or more available resources as a resource for a pending communication to the IC-capable receiver.

15. The apparatus of claim 14, wherein the one or more processors are further individually or collectively configured to:
repeatedly increase the exclusion threshold by the step increment and analyze one or more unselected resources, of the one or more resources in the resource selection window, until:
the total number of available resources in the set of one or more available resources satisfies the availability threshold; or
the exclusion threshold satisfies a limit threshold.

16. A method of wireless communication performed by a user equipment (UE), comprising:
receiving a first indication of capability information that indicates interference cancellation (IC) capability information associated with at least one UE;
receiving sidelink control information (SCI) that indicates sidelink resource reservation information in a resource selection window; and
transmitting a second indication of one or more reserved resources for a sidelink communication, the one or more reserved resources being based on the IC capability information and the sidelink resource reservation information, the second indication indicating which resources of the one or more reserved resources are intended for an IC-capable receiver that is different from the UE.

17. The method of claim 16, further comprising:
selecting, as one of the one or more reserved resources, a resource from one or more resources in the resource selection window based on a first exclusion threshold associated with communicating with an IC-incapable receiver and a second exclusion threshold associated with communicating with the IC-capable receiver.

18. The method of claim 17, wherein selecting the resource further comprises:
calculating a signal metric for the resource;
comparing the signal metric to the first exclusion threshold or the second exclusion threshold; and
determining whether to include the resource in a set of one or more available resources in the resource selection window based at least in part on the comparing.

19. The method of claim 18, further comprising:
selectively including the resource in the set of one or more available resources based at least in part on the signal metric satisfying the first exclusion threshold or the second exclusion threshold.

20. The method of claim 16, further comprising:
determining whether to include at least one resource, of one or more resources in the resource selection window, in a set of one or more available resources based at least in part on an exclusion threshold;
identifying that a total number of available resources in the set of one or more available resources fails to satisfy an availability threshold;
increasing the exclusion threshold by a step increment based at least in part on identifying that the total number fails to satisfy the availability threshold; and
analyzing an unselected resource, of the one or more resources in the resource selection window, based at least in part on the increased exclusion threshold.

21. The method of claim 20, wherein the exclusion threshold is associated with an IC-capable receiver, and
wherein analyzing the unselected resource based at least in part on the increased exclusion threshold further comprises:
determining whether to include the unselected resource in the set of one or more available resources as a resource for a pending communication to the IC-capable receiver.

22. The method of claim 21, further comprising:
repeatedly increasing the exclusion threshold by the step increment and analyzing one or more unselected resources, of the one or more resources in the resource selection window, until:
the total number of available resources in the set of one or more available resources satisfies the availability threshold; or
the exclusion threshold satisfies a limit threshold.

23. The method of claim 22, wherein a first exclusion threshold is associated with communicating with an IC-incapable receiver, wherein the exclusion threshold is a second exclusion threshold, and wherein the method further comprises:
increasing the first exclusion threshold by the step increment or another step increment based on:
the second exclusion threshold satisfying the limit threshold, and
the total number of available resources in the set of one or more available resources failing to satisfy the availability threshold; and
analyzing the one or more unselected resources based at least in part on the increased first exclusion threshold.

24. A non-transitory computer-readable medium storing a set of instructions, the set of instructions comprising:
one or more instructions that, when executed by one or more processors of a user equipment (UE), cause the UE to:
receive a first indication of capability information that indicates interference cancellation (IC) capability information associated with at least one UE;
receive sidelink control information (SCI) that indicates sidelink resource reservation information in a resource selection window; and
transmit a second indication of one or more reserved resources for a sidelink communication, the one or more reserved resources being based on the IC capability information and the sidelink resource reservation information, the second indication indicating which resources of the one or more reserved resources are intended for an IC-capable receiver that is different from the UE.

25. The non-transitory computer-readable medium of claim 24, wherein the one or more instructions further cause the UE to:
select, as one of the one or more reserved resources, a resource from one or more resources in the resource selection window based on a first exclusion threshold associated with communicating with an IC-incapable receiver and a second exclusion threshold associated with communicating with the IC-capable receiver.

26. The non-transitory computer-readable medium of claim 24, wherein the one or more instructions further cause the UE to:
determine whether to include at least one resource, of one or more resources in the resource selection window, in a set of one or more available resources based at least in part on an exclusion threshold;
identify that a total number of available resources in the set of one or more available resources fails to satisfy an availability threshold;
increase the exclusion threshold by a step increment based at least in part on identifying that the total number fails to satisfy the availability threshold; and
analyze an unselected resource, of the one or more resources in the resource selection window, based at least in part on the increased exclusion threshold.

27. An apparatus, comprising:
means for receiving a first indication of capability information that indicates interference cancellation (IC) capability information associated with at least one UE;
means for receiving sidelink control information (SCI) that indicates sidelink resource reservation information in a resource selection window; and
means for transmitting a second indication of one or more reserved resources for a sidelink communication, the one or more reserved resources being based on the IC capability information and the sidelink resource reservation information, the second indication indicating which resources of the one or more reserved resources are intended for an IC-capable receiver that is different from the apparatus.

28. The apparatus of claim 27, further comprising:
means for selecting, as one of the one or more reserved resources, a resource from one or more resources in the resource selection window based on a first exclusion threshold associated with communicating with an IC-incapable receiver and a second exclusion threshold associated with communicating with the IC- capable receiver.

29. The apparatus of claim 28, wherein the means for selecting the resource further comprises:
means for calculating a signal metric for the resource;
means for comparing the signal metric to the first exclusion threshold or the second exclusion threshold; and
means for determining whether to include the resource in a set of one or more available resources in the resource selection window based at least in part on the comparing.

30. The apparatus of claim 27, further comprising:
means for determining whether to include at least one resource, of one or more resources in the resource selection window, in a set of one or more available resources based at least in part on an exclusion threshold;
means for identifying that a total number of available resources in the set of one or more available resources fails to satisfy an availability threshold;
means for increasing the exclusion threshold by a step increment based at least in part on identifying that the total number fails to satisfy the availability threshold; and
means for analyzing an unselected resource, of the one or more resources in the resource selection window, based at least in part on the increased exclusion threshold.

* * * * *